Patented Mar. 23, 1948

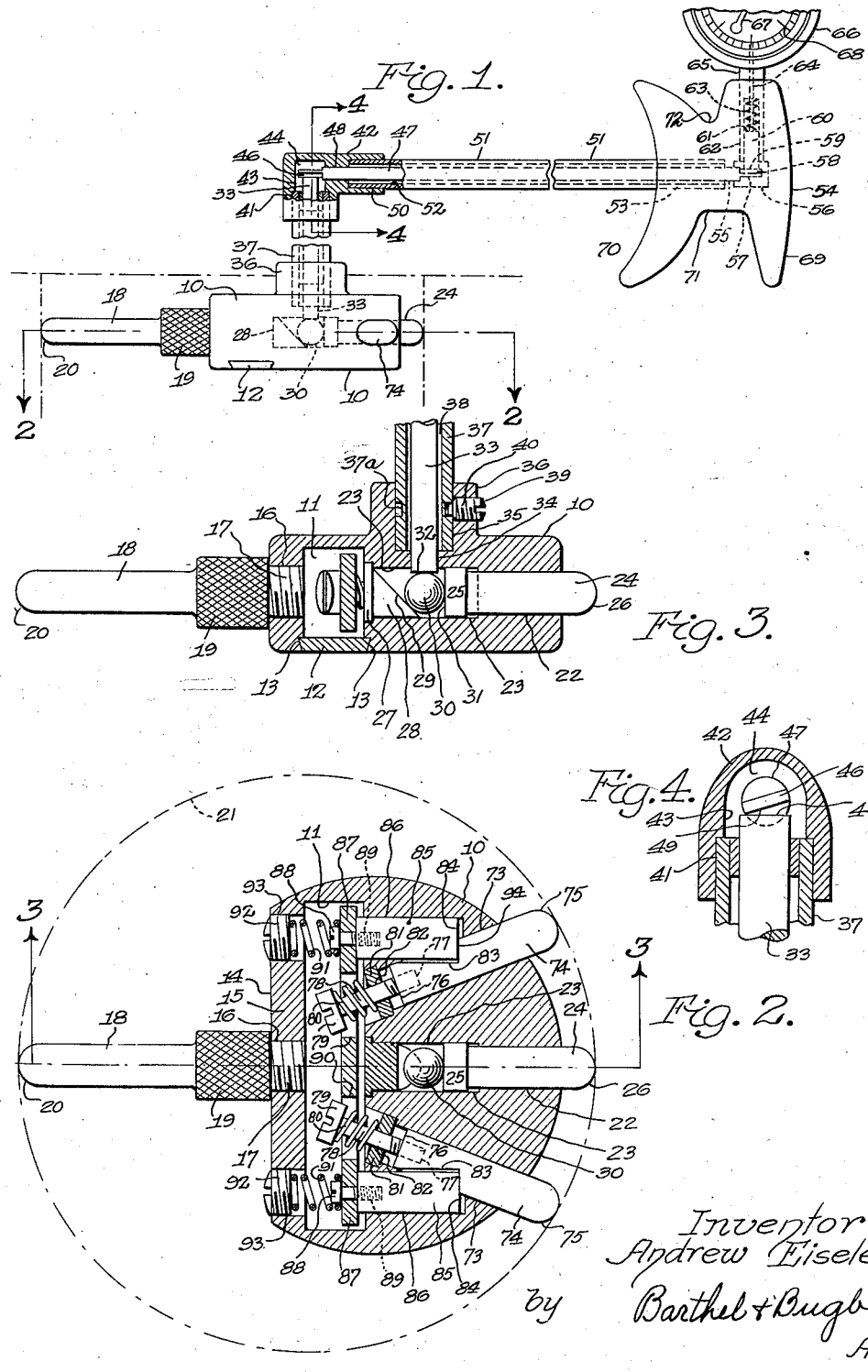

2,438,274

UNITED STATES PATENT OFFICE 2,438,274

INTERNAL BORE GAUGE

Andrew Eisele, Detroit, Mich.

Application October 19, 1945, Serial No. 623,199

4 Claims. (Cl. 33—178)

This invention relates to gauges, and in particular, to internal gauges of the dial indicator type.

One object of this invention is to provide an improved internal bore dial indicator gauge which is conveniently manipulated by one hand of the operator and which will be substantially self-adjusting to the bore which it is intended to measure.

Another object is to provide an internal bore dial indicator gauge wherein the motion of the movable measuring plunger is transmitted to the dial indicator by an improved mechanism which minimizes mechanical errors.

Another object is to provide an internal bore dial indicator gauge wherein the locating pins are arranged with their axes forming an acute angle, thereby enabling them to be mounted in a relatively small and compact holder or casing while possessing a large span between their contact points on the bore to be measured.

Another object is to provide a gauge as set forth in the preceding objects wherein the locating pins are spring-urged in such a manner as to be self-aligning relative to the bore, thereby automatically locating the measuring pins in coincidence with the diameter of the bore to be measured.

Another object is to provide a gauge as set forth in the preceding objects wherein the dial indicator is mounted upon a structure which is swivelled relatively to the head containing the measuring pins so as to permit measurements to be taken in any direction of the bore while maintaining the dial indicator in clear view of the operator.

Other objects and advantages of the invention will become apparent during the course of the following description of the accompanying drawing, wherein:

Figure 1 is a side elevation of a preferred form of an internal bore dial indicator gauge according to the invention, with portions broken away to show the construction more clearly;

Figure 2 is a horizontal section along the line 2—2 in Figure 1;

Figure 3 is a vertical section along the line 3—3 in Figure 2; and

Figure 4 is a fragmentary vertical section along the line 4—4 in Figure 1.

Referring to the drawing in detail, Figure 1 shows a preferred form of the internal bore dial indicator gauge of the invention as mounted on a head 10 which is in the form of a segment of a cylinder having a cavity 11 of rectangular cross-section. A closure plate 12 slidable into the oppositely bevelled portions 13 closes the cavity 11 along the bottom thereof. The cavity 11 is separated from the flat rear face 14 of the head 10 by a wall 15. The latter has a central threaded bore 16 for receiving the threaded end 17 of the fixed measuring pin 18, which is in the form of a thumbscrew with a knurled portion 19 and a rounded end 20. This construction enables measuring pins 18 of different lengths to be quickly and easily substituted for the pin shown, in order to adapt the device to bores 21 of different diameters.

The head 10 is also provided with a central bore 22 coaxial with the fixed measuring pin 18 and having an enlarged portion 23 therein (Figure 2). Reciprocably mounted in the bores 22 and 23 is a movable measuring pin 24 having a head 25 at its inner end engaging the bore 23, and a rounded end 26 engageable with the bore 21 to be measured. A plug 27 having a wedge portion 28 with an inclined surface 29 is secured in the inner end of the bore 23 and serves as an abutment for a ball 30 which is disposed in the bore 23 and the inner surface 31 of the head 25 (Figure 3). The ball 30 also is engaged by the lower end 32 of a vertical plunger 33 mounted for reciprocation in a bore 34 extending into the bore 23 from a socket 35 in a boss 36 rising from the head 10. Seated in the socket 35 is a tubular member 37 having an inner bore 38 spaced apart from but surrounding the plunger 33. The tubular member 37 is secured in the socket 35 by a set screw 39 threaded into the screw hole 40 (Figure 3) and groove 37a for swiveling.

The upper end of the tubular member 37 is firmly secured in any suitable way in a socket 41 in an elbow 42, the rod 33 passing through a bore 43 therein into a cavity 44. The upper end 45 of the plunger 33 engages a projection 46 on the end of a rod or shaft 47 rotatably mounted in the bore 48 of the elbow 42. The projection 46 has a substantially flat surface 49 where it is engaged by the plunger 33.

Coaxial with the bore 48 is a socket 50 (Figure 1) serving as a seat for the end of a tube 51 having an internal bore 52 surrounding but spaced apart from the shaft 47 and seated at its opposite end in a similar socket 53 in a handle 54. The shaft 47 at its opposite end passes through a bore 55 into a cavity 56 in the handle 54 and is provided at its end with a projection 57 similar to the projection 46 and having an upper surface 58 engaging the lower end 59 of the head 60 of a plunger 61 reciprocable vertically in a bore 62. The plunger 61 is surrounded by a coil spring 63 urging the plunger 61 downwardly.

The plunger 61 passes through a bore 64 in the stem 65 of a dial indicator 66 secured in the upper end of the bore 62. The dial indicator 66 (Figure 1) is of a conventional pattern whose details are well-known and in themselves form no part of the present invention. The dial indicator 66 is provided with a needle 67 connected by conventional mechanism to the plunger 61 and registering with a graduated circular scale 68 to indicate any suitable dimension such as thousandths of an inch. The handle 54 is provided with forward and rearward surfaces 69 and 70 configured for convenience of grasping between the palm and fingers of one hand, the handle 54 being cut away as at 71 and 72 to further facilitate such grasping.

The head 10 is provided with a pair of bores 73 (Figure 2) having their axes arranged at an acute angle. The bores 73 serve to receive the reciprocable locating pins 74 having rounded outer ends 75 and inner ends 76 provided with threaded sockets 77. Threaded into the sockets 77 are studs 78 having heads 79. Coil springs 80 are mounted between the heads 79 and plugs 81 which close the inner ends of the bores 73 and which have bores 82 through which the shanks of the studs 78 freely pass.

The pins 74 are notched as at 83 to receive the ends 84 of pins 85 which are reciprocable in bores 86 whose axes are parallel with the axis of the bore 22. The pins 85 are interconnected by a cross bar 87 secured thereto by the set screws 88 threaded into the sockets 89 in the ends thereof. The cross bar 87 is provided with apertures 90 for the free passage of the heads 79 of the studs 78. Coil springs 91 mounted between the cross bar 87 and plugs 92 threaded into the bores 93 in the wall 15 serve to urge the pins 85 into engagement with the notches 83. The coil springs 91 are considerably stronger than the coil springs 80 and hence overpower the latter so as to urge the pins 85 and 74 outwardly, thereby causing the curved ends 75 of the pins 74 to come into engagement with the bore 21 being measured. The weaker coil springs 80 serve to maintain the forward walls 94 of the notches 83 in engagement with the ends 84 of the pins 85.

In the operation of the invention, the proper length of fixed measuring pin 18 is first chosen and screwed into the bore 16. The gauge is then grasped in the hand of the user by means of the handle 54 and the lower portion thereof containing the head 10 and its associated parts pushed downwardly into the bore 21 to be measured. As the locating pins 74 enter the bore 21, their curved ends 75, urged by the pins 85 and coil springs 91 engaging the notches 83, adjust themselves to the bore 21 so that the axis of the measuring pins 24 and 18 is brought into coincidence with the diameter of the bore 21.

While this is occurring, the movable measuring pin 24 pushes the ball 30 up the incline 29 of the wedge portion 28 on the plug 27, causing the plunger 33 to be moved upwardly. The upper end of the upwardly-moving plunger 33 then engages the projection 46 on the end of the shaft 47, rotating the latter and causing the projection 57 to lift the plunger 61 and swing the needle 67 of the dial indicator 66 until it comes to rest opposite one of the graduations 68. The dimension may then be read directly off the dial indicator 66.

When the measurement is observed and, if desired, recorded, the head 10 and its associated parts are lifted out of the bore 21. The coil spring 63 then urges the plunger 61 downwardly and the foregoing movements of the shaft 47, plunger 33, ball 30 and pin 24 are reversed, causing the pin 24 to move outwardly from the head 10.

By the present invention, therefore, there has been provided an internal bore dial indicator gauge which is instantly adaptable to any diameter within the range of the instrument, and which is extremely accurate. The various moving parts are simple and direct in their action, with errors due to backlash minimized by the above-described construction. At the same time, the angled locating pins 74 permit a wide span between the ends 75 thereof, yet are housed in a relatively compact head 10. These automatically urge the measuring pins 18 and 24 into coincidence with the diameter of the bore 21. Fixed measuring pins 18 of various lengths may be provided in sets so that the proper fixed pin 18 can be quickly selected and screwed into the threaded bore 16 of the head 10, which is also swiveled on the tube 37.

While I have shown and described my invention in detail, it is to be understood that the same is to be limited only by the appended claims, for many changes may be made without departing from the spirit and scope of my invention.

What I claim is:

1. In a gauge, a head, a stationary measuring pin and a movable measuring pin mounted in alignment in said head, a pair of locating pins arranged at an acute angle on opposite sides of said movable measuring pin, a measurement indicator operatively connected to said movable measuring pin, and a pair of spring-loaded plungers mounted in said head and obliquely engaging and urging said locating pins outwardly relatively to said head.

2. In a gauge, a head, a stationary measuring pin and a movable measuring pin mounted in alignment in said head, a pair of movable locating pins arranged at an acute angle on opposite sides of said movable measuring pin, a measurement indicator operatively connected to said movable measuring pin, a pair of spring-loaded plungers mounted in said head with their outer ends obliquely engaging and urging said locating pins outwardly relatively to said head, and a cross-member secured to and interconnecting the inner ends of said plungers.

3. In a gauge, a head, a stationary measuring pin and a movable measuring pin mounted in alignment in said head, a pair of movable locating pins arranged at an acute angle on opposite sides of said movable measuring pin, a measurement indicator operatively connected to said movable measuring pin, and a pair of spring-loaded plungers mounted in said head with their axes substantially parallel to the axis of said movable pin and engaging and urging said locating pins outwardly relatively to said head.

4. In a gauge, a head, a stationary measuring pin and a movable measuring pin mounted in alignment in said head, a pair of movable notched locating pins arranged at an acute angle on opposite sides of said movable measuring pin, a measurement indicator operatively connected to said movable measuring pin, and a pair of spring-loaded plungers mounted in said head obliquely to said locating pins with their outer ends engaging said notches and urging said locating pins outwardly relatively to said head.

ANDREW EISELE.

REFERENCES CITED

The following references are of record in the file of this patent:

UNITED STATES PATENTS

| Number | Name | Date |
|---|---|---|
| 1,373,319 | Ferrand | Mar. 29, 1921 |
| 1,420,951 | Bartholdy | June 27, 1922 |
| 1,431,613 | Wittner | Oct. 10, 1922 |
| 1,671,168 | Steinle | May 29, 1928 |
| 2,095,405 | Adelborgh et al. | Oct. 12, 1937 |
| 2,268,579 | Eisele | Jan. 6, 1942 |
| 2,385,122 | Worthen | Sept. 18, 1945 |